United States Patent Office 3,151,140

Patented Sept. 29, 1964

3,151,140

HETEROLINEAR TETRAPHENYLBUTADIENE COMPOUNDS AND PROCESS OF PREPARING SAME

Karl W. Hubel, Emile H. Braye, and Ignace H. Caplier, Brussels, Belgium, assignors to Union Carbide Corporation, a corporation of New York No Drawing. Filed June 15, 1960, Ser. No. 36,130
7 Claims. (Cl. 260—431)

This invention relates to the preparation of organic compounds and to products resulting therefrom. More particularly, it relates to a process for the preparation of heterolinear and heterocyclic organic compounds.

The present invention greatly facilitates the synthesis of hetero-atom containing organic compounds in that it provides a new and general one-step method for this purpose. The lack of such a general method has heretofore sharply restricted the number of heterolinear and heterocyclic compounls (particularly the latter) to a relatively small amount.

According to this invention, a process for the preparation of heterolinear and heterocyclic organic compounds comprises reacting a 1,4-dilithio-tetraphenyl butadiene with a reactant represented by the formula:

$$(X)_xE(R)_y(R')_w$$

wherein X represents a member selected from the class consisting of halogens, hydroxy, alkoxy and phenoxy groups; E represents an element selected from the group consisting of gold, zinc, cadmium, mercury, boron, aluminum, gallium, indium, thallium, the lanthanides, silicon, germanium, tin, lead, titanium, zirconium, hafnium, nitrogen, phosphorus, arsenic, antimony, bismuth, vanadium, niobium, tantalum, oxygen, sulfur, selenium, tellurium, iron, cobalt, nickel, palladium and platinum; R represents a member selected from the class consisting of substituted and unsubstituted alkyl, aryl, cyclopentadienyl, phosphino, cyclobutadienyl and cyclooctatetraenyl groups; R′ represents a member selected from the class consisting of oxygen, sulfur, selenium, tellurium, and a carbonyl group; $x$ is an integer having a value of from 1 to 4; $y$ is an integer having a value of from 0 to 4; and $w$ is an integer having a value of from 0 to 2. Obviously, the value of $x$, $y$ and $w$ is such that the valence of E is satisfied.

Employing a monofunctional reactant, i.e. where $x$ is equal to 1, the compounds formed by the process of this invention will have the following structure:

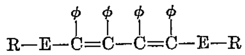

wherein R and E have the meanings defined above.

Employing a bi- or tri-functional reactant, i.e. where $x$ is equal to 2 or 3, or a tetrafunctional reactant where the element E has a valency of other than four, the compounds formed will have the following structure:

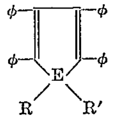

wherein E, R, and R′ also have the meanings defined above. It is to be understood that the number of substituents of R and/or R′, if any, bonded to E will be determined by that necessary to satisfy the remaining unfilled valency of E. For instance, if E has a valency of 2, the structure will have the formula:

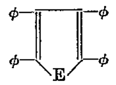

However, it has been found that when a tetrafunctional reactant is employed, i.e. in which $x$ is equal to 4, and when E has a valency of 4, the following spiro compounds are formed:

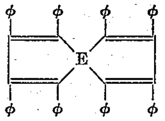

Among the general classes of reactants particularly preferred for the practice of this invention are those in which X is a halogen and in which R is a lower alkyl or phenyl group. However, in the practice of this invention, a broad range of mono and polyfunctional reactants may be employed.

In this regard, exemplary of the monofunctional reactants useful in the practice of this invention are methyl beryllium iodide ($CH_3BeI$), ethyl magnesium chloride ($C_2H_5MgCl$), methyl zinc chloride ($CH_3ZnCl$), ethyl cadmium chloride ($C_2H_5CdCl$), phenyl mercury chloride ($C_6H_5HgCl$), diphenyl boron chloride [$(C_6H_5)_2BCl$], dimethyl aluminum halide [$(CH_3)_2AlX$], dimethyl gallium chloride [$(CH_3)_2GaCl$], diphenyl indium chloride

[$(C_6H_5)_2InCl$]

diethyl thallium chloride [$(C_2H_5)_2TlCl$], tri-alkyl and tri-aryl silicon halides, such as $(CH_3)_3SiX$ and $(C_6H_5)_3SiX$ dimethyl isopropyl germanium bromide, trimethyl tin bromide [$(CH_3)_3SnBr$], triphenyl lead bromide

[$(C_6H_5)_3PbBr$]

triphenyl lead hydroxide

[$(C_6H_5)_3Pb(OH)$], $C_6H_5SO_2NCl$[Na]

diphenyl chloro phopsine [$(C_6H_5)_2PCl$], diphenyl chloro arsine [$(C_6H_5)_2AsCl$], diphenyl chloro stibine

[$(C_6H_5)_2SbCl$]

diphenyl chloro bismuthine, sulfuryl halides, dichloroselenoxide ($SeOCl_2$).

Exemplary of the polyfunctional reactants useful in the practice of this invention are [$P(CH_3)_3]_2NiCl_2$,

[$P(CH_3)_3]_2CoCl_2$ $C_8H_8PtI_2$, chlorine monoxide, sulfur halides such as $SCl_2$, $S_2Cl_2$, sulfuryl halides such as $SO_2Cl_2$, selenium halides such as $Se_2Cl_2$, selenoxides such as $SeOCl_2$, tellurium halides such as $TeCl_4$, $TeF_6$, N,N-dichloro-p-toluene-sulfonamide, phenyldichloro phosphine, ($C_6H_5PC_2$)

ethyl dichloro phosphine ($C_2H_5PCl_2$), trichlorophosphine ($PCl_3$), dibromo fluoro phosphine ($PBr_2F$), benzyl dichloro-phosphine ($C_6H_5CH_2PCl_2$), $C_6H_5P(S)Cl_2$, $(C_6H_5)_2P(S)Cl$ methyl diiodo phosphine ($CH_3PI_2$), phosphorus pentahalides such as $PBr_5$, $PCl_5$, phenyl dichloro arsine ($C_6H_5AsCl_2$)

phenyl dichloro stibine ($C_6H_5SbCl_2$), phenyl dichloro bismuthine ($C_6H_5BiCl_2$), bis-cyclopentadienyl-vanadium dichloride [$(C_5H_5)_2VCl_2$], bis-cyclopentadienyl-niobium tribromide [$(C_5H_5)_2NbBr_3$], bis-cyclopentadienyl-tantalum tribromide [$(C_5H_5)_2TaBr_3$], silicon tetrachloride, diphenyl-silicon dichloride [$(C_6H_5)_2SiCl_2$], germanium tetrachloride dimethyl-germanium-dichloride, tin tetrachloride, dimethyl-tin-diiodide [$(CH_3)_2SnI_2$], diphenyl-lead-dibromide, lead tetrachloride, bis-cyclopentadienyl-titanium dichloride [$(C_5H_5)_2TiCl_2$], bis-cyclopentyldienyl zirconium dichloride [$(C_5H_5)_2ZrCl_2$], bis-cyclopentadienyl-hafnium dichloride [$(C_5H_5)_2HfCl_2$], boron trichloride, tri-alkoxyboron such as [$B(OCH_3)_3$], phenylborondichloride ($C_6H_5BCl_2$), alkyl and aryl aluminum dichloride, methyl gallium dichloride ($CH_3GaCl_2$), methylindium dichloride ($CH_3InCl_2$), indium chloride ($InCl_2$), phenyl thallium dichloride, zinc chloride, cadmium chloride, mercury halides such as $HgBr_2$, phenyl gold dichloride, gold trichloride.

For the practice of this invention, it is preferable to employ at least stoichiometric amounts of the starting materials. The reaction is also usually carried out in a polar or non-polar organic solvent such as ether, dimethoxyethane, tetrahydrofurane, dioxane and the like.

The process of this invention is generally carried out at temperatures of between —50° C. and 200° C. While operation at such temperature ranges is generally acceptable, it should be noted that when preparing heterocyclic systems containing silicon, that heating above room temperature is highly preferable, i.e. heating of the order of between 60° C. and 120° C.

The pressures required by the process of this invention are not highly critical. However, it is preferable, when employing highly volatile reactants, to employ a closed system and an inert atmosphere.

The reactions product are easily removable from the reaction mixture after completion of the reaction using convenitonal techniques such as, for example chromatography. However, the technique will of course vary according to the nature of the reaction product. Suitable proven condition will be further illustrated in the specific examples hereinafter described relating to the present invention.

As mentioned previously, the process of this invention will result in a wide variety of compounds. In this regard, similar hereto-containing compounds have been produced by the process described in copending application S.N. 18,805, filed in the name of K. W. Hubel and E. Braye, on March 31, 1960. In that application the suffix "ole" was employed to generally designate the five-membered heterocyclic systems. Such nomenclature will also be hereinafter employed to refer to many of the heterocyclic compounds produced by the process of this invention. This nomenclature will be more apparent from the following list of purely representative heterocyclic compounds which may be produced by the process of this invention.

Hexaphenylzirconole
Tetraphenylselenophene
Tetraphenyltellurophene
Pentaphenylphosphole
Pentaphenylphosphole-S-
Benzyltetraphenylphosphole and the oxide thereof
p. Methyl-p. oxide-tetraphenylphosphole
Pentaphenylarsole
Pentaphenylstibole and the oxide thereof
Hexaphenylsilole
Tetraphenyl-mercurole
Zr bis(cyclopentadienyl)-tetraphenyl-zirconole
Aur chloro-tetraphenyl-aurole
Pentaphenyl-borole
Pentaphenyl-thallole
Hexaphenyl-stannole Exemplary of hetero-linear compounds obtainable by the process of this invention are 1,4-di(phenyl-mercury) 1,2,3,4-tetraphenyl-butadiene
1,4 bis(chloro sulfonyl) 1,2,3,4-tetraphenyl-butadiene.

Also with respect to the products obtainable by the process of this invention, of particular note is the preparation of a heretofore undisclosed class of compounds namely spiro systems having the following structure:

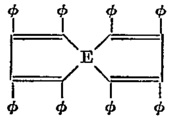

wherein E represents silicon, germanium, tin, lead, titanium, zirconium or hafnium.

Exemplary of such spiro structures are the following two representative compounds:

Octaphenyl-spiro-bicyclosilole
Octaphenyl-spiro-bicyclostannole

The invention may be further illustrated by the following examples:

EXAMPLE 1

3 g. (16.9 mM.) diphenylacetylene and 0.6 g. clean lithium shavings were shaken in 8 ml. dry diethylether in an inert atmosphere (nitrogen). After an induction period varying between ten and twenty minutes, the reaction mixture became brownish red. Shaking was continued for one to two hours. In some cases, the 1:4-dilithio-tetraphenylbutadiene precipitated out. Fifty ml. dry ether was added and the floating Li-shavings were removed mechanically; the mixture was thereupon cooled at about —40° C. and a solution containing 8.8 mM. $Se_2Br_2$ in 50 ml. benzene was added over a period of 10 minutes to the lithium derivative. The temperature was allowed to increase to room temperature. Red amorphous selenium was formed. By shaking for one night, the selenium crystallized and was filtered off (1.3 g.; 93%). The filtrate was washed with water. From the organic layer, there was obtained 2.39 g. (65% based on diphenylacetylene) of tetraphenylselenophene (M.P. 182° C.) which may be represented by the structure:

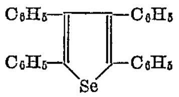

EXAMPLE 2

A similar amount of 1:4-dilithio-tetraphenyl-butadiene was prepared as described in Example 1. 60 ml. ether were thereupon added and then 0.8 g. (2.7 mM.) $TeCl_4$, whereby a vigorous reaction took place. After refluxing one hour, water and benzene were added. Chromatography of the reaction products on aluminum oxide, gave 0.61 g. (20% based on tolane) 1:2:3:4-tetraphenyl-butadiene and 0.7 g. (53.5% calculated on $TeCl_4$) tetraphenyltellurophene.

This compound, crystallized in colourless needles from a mixture of methylene chloride and ethanol, melted at 240–241° C.

*Anaylsis*

| | Found | Theoret. calculated for $C_{28}H_{20}Te$ (M.W.=484.08) |
|---|---|---|
| C | 70.13 | 69.48 |
| H | 4.21 | 4.17 |
| Te | 23.45 | 26.35 |

EXAMPLE 3

A suspension of 1:4-dilitho-1:2:3:4-tetraphenylbutadiene was prepared from 18 g. (100 mM.) diphenylacetylene, according to the procedure of Example 1. The volume of the reaction mixture was brought to 500 ml. by adding dry ether. Under stirring, a solution of 10 ml. (about 73 mM.) phenyldichloro-phosphine in 100 ml. ether was added slowly. After another 5 min. stirring, 50 ml. water was added. The fine yellow precipitate was filtered off, and washed with methanol and ether. A yield of 14.46 g. (62%) of pentaphenylphosphole (M.P.: 255–256.5) was obtained, which may be represented by the structure:

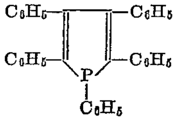

EXAMPLE 4

5.4 g. $C_6H_5$-P(S)$Cl_2$ was dissolved in 50 ml. ether. A suspension of 1.4 di-lithio-1:2:3:4-tetraphenylbutadiene prepared from 5 g. tolane (as in Example 1) was then slowly added. Beside pentaphenylphosphole, one isolated penthaphenylphosphole-sulphide (M.P. 196°), identical with the compound obtained from the sulfuration of pentaphenyl-phosphole.

*Analysis*

| | Found | Theoretically calculated for $C_{34}H_{25}PS$ (M.W.=496.61) |
|---|---|---|
| C | 82.11 | 82.23 |
| H | 5.31 | 5.08 |
| P | 6.29 | 6.24 |
| S | 6.10 | 6.45 |

This substances may also crystallize with one mole methylene chloride, which is lost at 100–120° C.

EXAMPLE 5

To a suspension of 1:4-dilithio-1:2:3:4-tetraphenylbutadiene, prepared from 2 g. (11.24 mM.) tolane and Li in accordance with the procedure of Example 1, a solution of 1.5 ml. $C_6H_5CH_2PCl_2$ (about 10 mM.) was added. After 15 min. water was added, the organic layer dried, evaporated, and the residue taken up in benzene. This solution was chromatographed over aluminum oxide.

Elution with benzene yielded 0.85 g. (32%) P-benzyltetraphenylphosphole, crystallizing into yellow, strongly fluorescent leaflets, of M.P. 203–213° (microsc.), 190° (Kofler hot stage).

*Analysis*

| | Found | Theoretic. calculated for $C_{35}H_{27}P$ (M.W.=478.6) |
|---|---|---|
| C | 87.06–87.00 | 87.86 |
| H | 5.64–5.56 | 5.27 |

Elution with ethyl acetate yielded in small amounts the corresponding oxide which crystallized in needles (from petroleum ether) or leaflets (from diethylether or petroleum ether), M.P.: 228–230° C.

*Analysis*

| | Found | Theoretic. calculated for $C_{35}H_{27}OP$ (M.W.=494.6) |
|---|---|---|
| C | 84.35 | 85.01 |
| H | 5.46 | 5.10 |

EXAMPLE 6

The same di-lithium-compound obtained from 2 g. diphenyl-acetylene was treated as in Example 4 with 1 ml. $CH_3PI_2$. By chromatography, P-methyl-P-oxide-tetraphenylphosphole, a slightly fluorescent and pale yellow product of M.P.: 240.5–241.5° C. (from chloroform and ether) was obtained.

*Analysis*

| | Found | Theoretic. calculated for $C_{29}H_{23}OP$ (M.W.=418.48) |
|---|---|---|
| C | 82.79 | 83.22 |
| H | 5.44 | 5.54 |

EXAMPLE 7

To a suspension of 1:4-dilithio-tetraphenyl-butadiene prepared according to Example 1, from 5 g. diphenylacetylene, 2 ml. $C_6H_5AsCl_2$ was added. After addition of water, a greenish yellow precipitate was filtered off, and washed with alcohol and ether. This product 4.0 g. :56% based on diphenylacetylene) is strongly fluorescent, melts at 213–214.5° C. and according to analysis and I.R. spectra, is penta-phenyl-arsole. This compound may be represented by the structure:

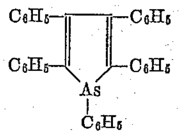

*Analysis*

| | Found | Theoretic. calculated for $C_{34}H_{25}As$ (M.W.=508.48) |
|---|---|---|
| C | 79.22 | 80.30 |
| H | 4.77 | 4.96 |

EXAMPLE 8

To a suspension of 1:4-dilithio-1:2:3:4-tetraphenylbutadiene, 1.84 g. $C_6H_5SbCl_2$, dissolved in about 50 ml. dry ether, was added. The reaction mixture was refluxed for 5 hours. After addition of water, the organic products were extracted with benzene, the dried organic layer evaporated and the residue, dissolved in benzene, was chromatographed on silica gel. The fraction eluted with a mixture of benzene/petroleum ether, yielded 0.8 g. (14.4%) of big greenish yellow crystals of M.P. 162–170° C. (decomposition).

The I.R. spectra showed analogy with the corresponding phosphor- and arsenic-heterocyclic compounds and was also fluorescent (greenish shade). This compound was fairly easily oxidized in solution. The corresponding yellow oxide was not fluorescent and melted under decomposition at 250–255° C.

*Analysis*

| | Found | Theoret. calculated for $C_{34}H_{25}OSb$ (M.W.=571.33) |
|---|---|---|
| C | 72.12 | 71.47 |
| H | 4.65 | 4.41 |
| O | 2.74 | 2.80 |

EXAMPLE 9

Tolane (3 g.; 16.9 mM.) was shaken with excess Li for 1 hour in 8 ml. ether as in Example 1. Dioxane (60 ml.) and $SiCl_4$ (0.34 ml.=0.505 g.=3 mM.) was added. The diethylester was removed by distillation. After one hour reflux (at 100° C.), water and benzene were added. By chromatography, there was separated 0.59 g. (27% based on $SiCl_4$) yellow nonfluorescent crystals, melting from 140 to 280° C. This compound may be represented by the structure:

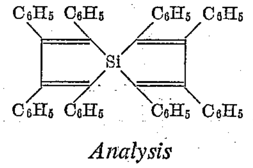

*Analysis*

| | Found | Theoretically calculated for $C_{56}H_{40}Si$ (M.W.=741.03) |
|---|---|---|
| C | 90.71 | 90.76 |
| H | 5.73 | 5.44 |
| Si | [2.45] | 3.80 |

EXAMPLE 10

To a suspension of 1:4-dilithio-1:2:3:4-tetraphenylbutadiene prepared from 9 g. (50 mM.) diphenylacetylene, 300 ml. pure tetrahydrofurane (T.H.F.) and 5.2 ml. (6.3 g.=25 mM.) diphenyl-dichloro-silane were added. The diethylether was distilled off and the reaction mixture refluxed for four hours. Water and benzene were thereupon added. 6.7 g. (50%) pale greenish yellow strongly fluorescent crystals were obtained with M.P.: 190–191° C. (from isopropanol). The structure may be called hexaphenyl-silole and may be represented as follows:

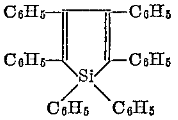

*Analysis*

| | Found | Theoretic. calculated for $C_{40}H_{30}Si$ (M.W.=538.73) |
|---|---|---|
| C | 88.97 | 89.18 |
| H | 5.67 | 5.61 |
| Si | 5.22 | 5.21 |

EXAMPLE 11

To a suspension of 1:4 dilithio-1:2:3:4-tetraphenylbutadiene, prepared from 3 g. (16.9 mM.) tolane, in ether, 0.33 ml. (6 mM.) $SnCl_4$ was added. After 1 hour reflux, 0.95 g. (19%) yellow crystals of M.P. 265–272° C. were obtained after chromatography on silica gel. The structure of the compound obtained is analogous to the one obtained in Example 9 with the exception that Sn is substituted for Si.

*Analysis*

| | Found | Theoretic. calculated for $C_{56}H_{40}Sn$ (M.W.=831.64) |
|---|---|---|
| C | 80.36 | 80.87 |
| H | 4.60 | 4.85 |
| Sn | 14.24 | 14.27 |

EXAMPLE 12

2 g. (7.4 mM.) $HgCl_2$, dissolved in 100 ml. ether, were added slowly and under cooling to a suspension of 1:4-dilithio-tetraphenylbutadiene, prepared from 3 g. (16.9 mM.) tolane, in ether.

Following the procedure previously outlined, minor amounts of tetraphenylbutadiene and, in a good yield, a yellow compound of M.P. 188–190° C. (from $CH_2Cl_2$ and ethanol) was obtained. This product contained a great percentage of mercury; its I.R. spectrum, analysis and M.P. indicate a structure which may be represented as follows:

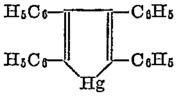

*Analysis*

| | Found | Theoretic. calculated for $C_{28}H_{20}Hg$ (M.W.=557.08) |
|---|---|---|
| C | 55.32 | 60.27 |
| H | 3.28 | 3.62 |

EXAMPLE 13

The same lithium-compound, prepared from 5 g. tolane, was reacted with 8.77 g. $C_6H_5HgCl$ (stoichiometric amounts), and dissolved in 200 ml. dioxane. Beside LiCl, $HgCl_2$, Hg, $(C_6H_5)_2Hg$ and 1.5 g. unreacted $C_4H_5HgCl$, there was obtained in fairly good yield, a pale yellow compound, M.P. 145° C. Its I.R. spectrum and analysis indicate a formula of:

1:4-bis(phenylmercuri)-1:2:3:4-tetraphenyl-butadiene.

*Analysis*

| | Found | Theoretic. calculated for $C_{40}H_{30}Hg_2$ |
|---|---|---|
| C | 56.74 | 52.69 |
| H | 3.69 | 3.32 |
| Hg | 38.98 | 43.99 |

EXAMPLE 14

1.6 g. bis-cyclopentadienyl-zirconium dichloride, dissolved in the necessary amount of ether, was added to a suspension of the above-mentioned dilithium-compound prepared from 3 g. tolane. Orange square plates crystallized out immediately with LiCl. The mixture was filtered, washed quickly with water and immediately dried in vacuum. The yield varied between 45% and 65%. Alcoholysis or hydrolysis yielded cyclopentadiene, tetraphenylbutadiene and zirconiumoxide. The compound, which decomposes at 140–170° C., may be represented as follows:

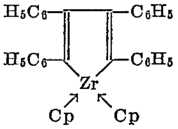

[Cp=cyclopentadienyl]

EXAMPLE 15

A solution of 0.77 g. $AuCl_3$, dissolved in 200 ml. ether, was added to Li—CPh=CPh—CPh=CPh—Li. After one hour reflux, the reaction mixture was filtered off, the filtrate evaporated and the residue, dissolved in a minimum amount of benzene, chromatographed on silicagel. The fraction eluted with benzene yielded yellow brown crystals, which after recrystallization from $CH_2Cl_2$, gave needles of M.P. 185–192° C. (decomposition). This compound contained chlorine and the content of gold, estimated by X-ray fluorescence, indicated a percentage of about 30%. The structure may be represented as follows:

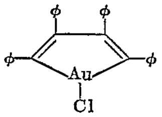

*Analysis*

| | Found | Theoretic. calculated for $C_{28}H_{20}AuCl$ (M.W.=588.93) |
|---|---|---|
| C | 58.28 | 57.10 |
| H | 3.64 | 3.43 |
| Au | 35.10 | 33.6 |

EXAMPLE 16

1.6 ml. $C_6H_5BCl_2$, dissolved in 20 ml. ether, was added to an ethereal (30 ml.) suspension of the dilithium-compound prepared from 3.6 g. diphenylacetylene. The reaction mixture was kept 20 hours at room temperature and then filtered. The filtrate was evaporated to dryness, the residue taken up in benzene, and chromatography on silica gel yielded among other, 2.65 g. of a yellow product of M.P. 150–155° C.

Anaylsis indicates the structure to be as follows:

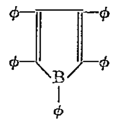

*Analysis*

| | Found | Theoretic. calculated for $C_{34}H_{25}B$ (M.W. =444.39) |
|---|---|---|
| C | 92.16 | 91.89 |
| H | 6.04 | 5.67 |
| B (diff.) | | 2.44 |

EXAMPLE 17

By reacting $C_6H_5TlCl_2$ in accordance with the procedure previously outlined, Li—CPh=CPh—CPh=CPh—Li pentaphenyl-thallol was obtained which had a faintly yellow color. The structure may be represented as follows:

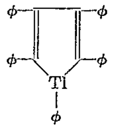

M.P.: 165–169 (decomp.)

*Analysis*

| | Found | Theoret. calculated for $C_{34}H_{22}Tl$ |
|---|---|---|
| C | 62.12 | 64.0 |
| H | 3.83 | 3.95 |

EXAMPLE 18

A solution of 1:4-dilithio-tetraphenylbutadiene, prepared in 10 ml. ether from 3 g. diphenylacetylene and an excess of Li, was diluted with ether to 60 ml. and added slowly to a solution of 2 ml. sulfurylchloride in 80 ml. ether, at a tempearture of −50° C. The temperature was allowed to increase to room tempearture, water was added, and the yellow precipitate, consisting of 0.230 g. tetraphenylthiophene-dioxide, M.P. 286–288° C., was filtered off. The filtrate was extracted with benzene, the organic layer dried over $Na_2SO_4$, evaporated to dryness, and the residue was recrystallized from ethanol/petroleum ether, yielding 0.620 g. colourless crystals of M.P.: 157–159° C.(dec.) consisting of 1:4-bis(Chlorosulfonyl-) 1:2:3:4-tetraphenyl-butadiene.

[Cl—$SO_2$—CPh=CPh—CPh=CPh—$SO_2$Cl]

*Analysis*

| | C | H | O |
|---|---|---|---|
| Found | 61.94 | 3.88 | 11.14 |
| Calcul. for $C_{28}H_{20}Cl_2O_4S_2$, M.W.=555.51 | 60.54 | 3.63 | 11.52 |

This compound is transformed easily into tetraphenylthiophene-dioxide by merely melting the compound.

EXAMPLE 19

To an ethereal solution of 1:4-dilithio-tetraphenylbutadiene, prepared from 3 g. diphenylacetylene, 3 g. $Ph_2SnCl_2$ (50% excess), dissolved in 50 ml. ether, were added. After the vigorous reaction has ceased, water is added and the reaction mixture is treated according to previous methods. Hexaphenylstannole, (slightly fluorescent yellow greenish crystals) M.P. 172–3° C. was obtained in a yield of 2.15 g. (40% based on tolane).

*Analysis*

| | C | H |
|---|---|---|
| Found | 75.98 | 4.65 |
| Calcul. for $C_{40}H_{30}Sn$, M.W.=629.38 | 76.33 | 4.81 |

The hetrocyclic systems prepared employing the process of this invention are important intermediates for many organic syntheses. For example, they may be used in the preparation of dyes, pigments, pharmaceuticals, or for the preparation of organo-metallic complexes in a manner similar to that disclosed in copending application 56,366, filed in the names of K. W. Hubel and E. Weiss on September 16, 1960 and now abandoned.

In addition many of the five-membered heterocyclic compounds are strongly fluorescent materials and may be employed as such. Exemplary of such fluoroscent heterocyclic systems are the arsoles, phospholes, stiboles and siloles. In this regard, these compounds generally exhibit a yellow-green fluorescence comparable to that of zinc or cadmium sulfides. The fluorescence spectrum can be often shifted to the corresponding oxide thereby making it possible to variably provide a fluorescent compound having the particular fluorescent spectrum desired.

The hetero-containing compounds of this invention also behave as dienes and can, therefore, be involved in Diels-Alder reactions. For example, the reaction of pentaphenylphosphole with the dimethyl ester of acetylene dicarboxylic acid yields the dimethyl ester of tetraphenyl phathalic acid in almost quantitative amounts. A normal adduct is also obtained by Diels-Alder addition with maleic anhydride. The linear hetero-atom containing compounds are also useful as intermediates for drug and pharmaceutical preparations.

Another general use for the metal containing compounds prepared by the process of this invention is as anti-knock additives in motor fuels either alone or in conjunction with other organo-metallic compounds. They could also be used as metal-plating agents. For this use, the metal containing compounds obtainable by the process of this invention are contacted with a platable substrate at a temperature of more than the decomposition temperature of the metal containing compound, either in solution or in a vapor phase. A platable substrate will be, for instance, glass cloth, a metal or a plastic surface or the like.

What is claimed is:

1. A process for the preparation of heterolinear organic compounds which comprise reacting a 1,4-dilithio-tetraphenyl-butadiene with a reactant represented by the formula:

$$XE(R)_y(R')_w$$

wherein X is halogen, bonded to E; E represents an element selected from the group consisting of gold, zinc, cadmium, mercury, boron, aluminum, gallium, indium, thallium, the lanthanides, silicon, germanium, tin, lead, titanium, zirconium, hafnium, nitrogen, phosphorus, arsenic, antimony, bismuth, vanadium, niobium, tantalum, sulfur, selenium, and tellurium; R represents a member bonded to E selected from the class consisting of phenyl and lower alkyl; R' is oxygen bonded to E; $y$ is an integer having a value of from 0 to 4; and $w$ is an integer having a value of from 0 to 2; the values of $y$ and $w$ being such that the valence of E is satisfied.

2. A process according to claim 1, in which stoichiometric amounts of the reactants are employed.

3. A process according to claim 1, in which the reaction is carried out at a temperature of between −50° and 200° C.

4. A process according to claim 1, in which E is silicon, and the reaction is carried out at temperatures of between 60° C. and 120° C.

5. A process according ot claim 1, in which the reaction is carried out in an organic solvent selected from the group consisting of ether, dimethoxyethane, tetrahydrofurane and dioxane.

6. 1,4-di(phenyl-mercury) 1,2,3,4 tetraphenylbutadiene.

7. 1,4-bis(chloro-sulfonyl) 1,2,3,4 tetraphenylbutadiene.

References Cited in the file of this patent

UNITED STATES PATENTS

| | | |
|---|---|---|
| 2,160,915 | Schreiber | June 6, 1939 |
| 2,839,566 | Letsinger et al. | June 17, 1958 |

FOREIGN PATENTS

| | | |
|---|---|---|
| 885,847 | Germany | July 8, 1949 |

OTHER REFERENCES

Leavitt et al.: J.A.C.S. 81, No. 12, pages 3163–3164 (June 20, 1959).

Patterson et al.: "The Ring Index" (1940), pub. by Reinhold Publishing Corp. (N.Y.), A.C.S. Monograph Series, pages 43 and 44.

West: "Journal of The American Chemical Society," vol. 76, No. 23, Dec. 5, 1954, pp. 6013–6017.

Bergmann et al.: "Justus Liebig's Annalen der Chemie," vol. 500, No. 2, Jan. 20, 1933, pages 122–136.

Kuivila et al.: "Journal of The American Chemical Society," vol. 80, No. 13, July 5, 1958, pages 3250–3253.

Smith et al.: "Journal of The American Chemical Society," vol. 63, No. 5, May 1941, pages 1184–1187.

Gilman et al.: "Journal of The American Chemical Society," vol. 77, No. 23, Dec. 5, 1955, pages 6380–6381.

Henry et al.: "Journal of The American Chemical Society," vol. 82, No. 5, Feb. 5, 1960, pages 561–563.